(12) United States Patent
Mishra et al.

(10) Patent No.: US 8,541,401 B2
(45) Date of Patent: Sep. 24, 2013

(54) FLAVORANT ESTER SALTS OF POLYCARBOXYLIC ACIDS AND METHODS FOR IMMOBILIZING AND DELIVERING FLAVORANTS CONTAINING HYDROXYL GROUPS

(75) Inventors: Munmaya K. Mishra, Richmond, VA (US); Shengsheng Liu, Richmond, VA (US); Diane S. Kellogg, Ashland, VA (US)

(73) Assignee: Philip Morris USA Inc., Richmond, VA (US)

( * ) Notice: Subject to any disclaimer, the term of this patent is extended or adjusted under 35 U.S.C. 154(b) by 528 days.

(21) Appl. No.: 12/216,700

(22) Filed: Jul. 9, 2008

(65) Prior Publication Data

US 2009/0028803 A1    Jan. 29, 2009

Related U.S. Application Data

(60) Provisional application No. 60/935,068, filed on Jul. 25, 2007.

(51) Int. Cl.
*A01N 43/00*    (2006.01)
*A61K 31/33*    (2006.01)

(52) U.S. Cl.
USPC ............. 514/183; 424/49; 426/650; 426/590; 131/276

(58) Field of Classification Search
None
See application file for complete search history.

(56) References Cited

U.S. PATENT DOCUMENTS

| | | |
|---|---|---|
| 2,305,622 A | 12/1942 | Kremers |
| 3,111,127 A | 11/1963 | Jarboe |
| 3,312,226 A | 4/1967 | Bavley et al. |
| 4,212,310 A | 7/1980 | Van Auken et al. |
| 5,144,964 A | 9/1992 | Demain |
| 5,148,817 A * | 9/1992 | Houminer et al. ............ 131/278 |
| 5,199,450 A * | 4/1993 | Houminer et al. ............ 131/276 |
| 5,692,525 A | 12/1997 | Counts et al. |
| 5,725,865 A | 3/1998 | Mane et al. |
| 5,752,529 A | 5/1998 | Mane et al. |
| 6,761,174 B2 | 7/2004 | Jupe et al. |
| 6,884,906 B2 | 4/2005 | Dewis et al. |
| 2002/0193269 A1 | 12/2002 | Anderson et al. |
| 2005/0000528 A1 | 1/2005 | Bereman |
| 2005/0241656 A1 | 11/2005 | Kennison |

FOREIGN PATENT DOCUMENTS

| | | |
|---|---|---|
| CA | 700009 A | 12/1964 |
| EP | 0510817 A1 | 10/1992 |
| EP | 0746986 A2 | 12/1996 |

OTHER PUBLICATIONS

International Search Report and Written Opinion mailed Jul. 21, 2009 for PCT/IB2008/002792.
International Preliminary Report on Patentability issued Jan. 26, 2010 for PCT/IB2008/002792.
Simon et al., "Thermoanalytical Study of O,O'-Dibenzoyl-(2R, 3R)-Tartaric Acid SMC, Part IV. SMC formation in melt," *Journal of Thermal Analysis and Calorimetry*, vol. 75 (2004), pp. 787-793.

* cited by examiner

*Primary Examiner* — Brandon Fetterolf
*Assistant Examiner* — Jean Cornet
(74) *Attorney, Agent, or Firm* — Buchanan Ingersoll & Rooney PC

(57) ABSTRACT

Compositions are provided which contain immobilized flavorants for flavor delivery. In particular, smoking compositions are provided which contain flavorant ester salts of polycarboxylic acids.

5 Claims, 2 Drawing Sheets

Proton NMR of monomenthyl succinate:

FLAVORANT ESTER SALTS OF POLYCARBOXYLIC ACIDS AND METHODS FOR IMMOBILIZING AND DELIVERING FLAVORANTS CONTAINING HYDROXYL GROUPS

This application claims priority under 35 U.S.C. §119 to U.S. Provisional Application No. 60/935,068 entitled FLAVORANT ESTER SALTS OF POLYCARBOXYLIC ACIDS AND METHODS FOR IMMOBILIZING AND DELIVERING FLAVORANTS CONTAINING HYDROXYL GROUPS, filed Jul. 25, 2007, the entire content of which is hereby incorporated by reference.

SUMMARY

In one embodiment, a smoking composition is provided comprising a smokable material and an ester of an alcohol moiety that is a flavorant and an acid moiety that is a polycarboxylic acid salt (FES). A carboxyl group of a polycarboxylic acid is esterified with the alcohol moiety, wherein at least one of the remaining carboxyl groups of the polycarboxylic acid is in the form of a salt, and wherein there is at least one carbon atom between the carbonyl carbon of the ester and the carboxyl carbon forming the salt.

In another embodiment, a method for delivering a flavorant compound containing at least one hydroxyl group from an FES is provided.

In another embodiment, manufactured items are provided containing FES's.

In another embodiment, a comestible composition is provided comprising an FES.

DETAILED DESCRIPTION OF PREFERRED EMBODIMENTS

Figure 1:
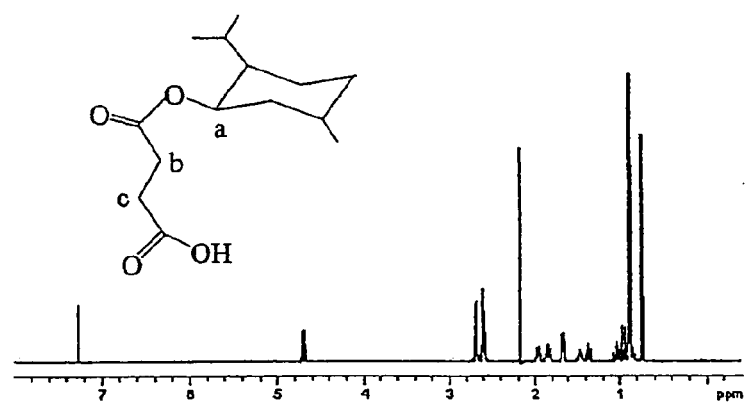
FIG. 1 illustrates a $^1$H NMR spectrum of monomenthyl succinate.

This disclosure relates to methods of immobilizing and controllably releasing flavorants which contain hydroxyl group(s), and to compositions containing the immobilized flavorants.

Flavorants

A flavorant is a compound which imparts a desired flavor or aroma to a composition, such as a comestible or smokable composition. Flavorants contain at least one hydroxyl group and do not decompose during ester formation or during flavorant release. Examples include, but are not limited to, vanillin, linalool, menthol, guaicol, thymol, eugenol and geraniol. Immobilized flavorants are flavorants that require subsequent release to impart the flavor or aroma, preferably by pyrolysis, hydrolysis, or other cleavage of an ester linkage.

Flavorant Esters

A flavorant ester is an ester containing a flavorant as the alcohol moiety, and an acid moiety, preferably a carboxylic acid moiety, and more preferably a polycarboxylic acid moiety. Preferred polycarboxylic acid moieties include malonic acid, succinic acid, glutaric acid and adipic acid moieties.

Flavorant Ester Salts of Polycarboxylic Acids

A flavorant ester salt of a polycarboxylic acid (FES) is an ester containing a flavorant alcohol moiety and a polycarboxylic acid moiety, wherein at least one carboxyl group is esterified with the flavorant and at least one carboxyl group is in the form of an ionic salt. The counter-ion of the carboxylate salt may be any cation which does not negatively impact the flavorant profile at flavorant release. Preferred cations are metal cations, particularly, alkali metal or alkaline earth metal cations. Sodium, potassium, calcium and magnesium salts are preferred alkali metal and alkaline earth metal cations. If multiple carboxylate groups form salts in the FES, the counter-ions may be the same or different. If multiple carboxyl groups are esterified with flavorants in the FES, the flavorants may be the same or different.

Preferably, there is at least one carbon atom between the esterified carboxyl moiety and the carboxylate salt in the FES. More preferably, the esterified carboxyl moiety is one to four atoms away from the carboxylate salt moiety. Most preferably, the esterified carboxyl moiety is two to three atoms away from the carboxylate salt moiety.

Smokable Material

A smokable material is any material that is to be ignited or smoldered and inhaled. Preferred examples include tobacco and tobacco substitutes, particularly rods of tobacco or tobacco substitutes, or combinations thereof. Smokable materials preferably do not include combustible papers, wrappers, or other material that surround, overlap, or hold rods of tobacco or tobacco substitutes.

Formation of Flavorant Ester Salts of Polycarboxylic Acids

An FES may be formed by a variety of methods. For example, a carboxylic acid anhydride can be reacted with a flavorant containing at least one hydroxyl group. In this reaction, a flavorant ester is formed using one of the carbonyl groups of the anhydride, while a carboxylic acid is formed at the other carbonyl group of the anhydride. This reaction is usually carried out in a solvent and under an inert atmosphere. This reaction can also be carried out in the presence of a substitution reaction enhancing agent, such as p-toluene sulfonic acid or methane sulfonic acid. The resulting flavorant ester carboxylic acid can then be treated with a base to form the salt of the flavorant ester carboxylic acid.

As an additional example, flavorant ester carboxylic acids may be formed through partial esterification of polycarboxylic acids. This method can be particularly effective if one of the carboxylic acid moieties of the polycarboxylic acid is less sterically hindered, or is otherwise more reactive than the other carboxylic acid moieties in the polycarboxylic acid. The resulting flavorant ester can then be treated with a base to form the flavorant ester salt.

Flavorant Release from Flavorant Ester Salts of Polycarboxylic Acids

There are a variety of ways in which the flavorant compounds can be released from FES's and delivered into or delivered by the associated product, including pyrolysis and hydrolysis. The method of release will vary depending on the nature of the product that the FES is used in. For example, if the FES is contained in a combustible or smokable product, flavorant release may be accomplished by pyrolysis. On the other hand, if the FES is contained in a comestible, for example, flavorant release may be accomplished by hydrolysis.

Comparison of Pyrolytic Flavorant Release from Flavorant Ester Carboxylic Acids and from Flavorant Ester Salts of Polycarboxylic Acids Pyrolysis of esters often produces elimination products, and when one is seeking to pyrolytically release a flavorant compound containing one or more hydroxyl groups from an ester, these elimination products are often a major, undesirable by-product. For example, experiments show that the pyrolysis of monomenthyl succinate produces about twice as much menthene as menthol. This production of by-product is undesirable for at least the reason that it reduces the menthol yield of the additive when the smoking composition is used, which can require that more FES be added to obtain the desired flavor effect. In addition, because the menthene yield of a typical pyrolysis reaction may vary, it is difficult to know in advance how much FES to add to a combustible or smokable composition to obtain a given flavor effect. Surprisingly, it has been found that the pyrolysis of salts of monomenthyl succinate produces menthol with very little, if any, menthene production. Without being bound by theory, it is thought that the carboxylate salt interacts with the ester, possibly with its carbonyl moiety, in such a way as to lessen, if not completely halt, formation of menthene in the pyrolysis of the ester.

These surprising results have been found with several monomenthyl succinate salts, including sodium, potassium, calcium and magnesium salts, and are believed to extend to other salts as well.

The surprising reduction in menthene production obtained by including an FES in a combustible or smokable composition has several benefits, including an increase in the efficiency of menthol release from the menthyl ester as well as greater control over the flavoring of products made using such compounds.

Smoking Compositions

In one embodiment, a smoking composition is provided which comprises a mixture of a smokable material and one or more FES's, where there is at least one carbon atom between the carbonyl carbon of any ester and the carbonyl carbon of any carboxylate salt.

In one embodiment, the FES's comprise between 0.001 and 10 weight percent of the smoking composition, based on the weight of the smokable material.

The FES's may be incorporated into a smoking composition in a variety of manners. For example, the FES's can be processed into solid shapes which can be placed at any desired location of the tobacco rod for a cigarette, cigar, cigarillo or other like article.

Additionally, the FES's can be dissolved in an appropriate solvent and applied to a tobacco or non-tobacco substitute, for example, by spraying. Further, the FES's may be suspended in a liquid and applied to a tobacco or non-tobacco substitute, for example, by spraying. Also, the FES's may be added as a solid, for example in powder or granule form, to a tobacco or non-tobacco substitute.

Tobacco or non-tobacco substitutes treated by one of these methods may also be used as a flavor enhanced tobacco or non-tobacco substitute which may optionally be later blended with other tobaccos or non-tobacco substitutes.

Release of the flavorant from the FES's can be accomplished by pyrolysis in applications where the smoking composition is burned, as well as in applications where the smoking composition is only heated such as, for example, electrically heated cigarettes.

Smoking Articles

In one embodiment, smoking articles are provided which comprise a smoking composition incorporating one or more FES's.

In another embodiment, FES's are applied to or incorporated in the wrapper of the smoking article. For example, the FES's may be printed upon the wrapper of the smoking article. Further, the FES's may be printed in distinct patterns on the wrapper to provide different effects when using the smoking article. For example, the FES's can be printed on the wrapper near the filter end of the tobacco rod, which would provide a unique flavor when reaching the end of the smoking article. Additionally, multiple FES's incorporating different flavorant compounds can be printed on the wrapper of the smoking article to provide different flavors at different times. This multiple flavor effect could also be produced by placing solid particles of different FES's at different positions in the tobacco rod of the smoking article.

Cigars, cigarettes, cigarillos and the like generally comprise a rod of smokable material with a circular cross section surrounded by a wrapper, which may be made from paper, reconstituted tobacco sheets, natural leaf wrappers or other combustible sheet materials. Optionally, these articles may include a filter, through which the consumer inhales. In a cigarette, cigar, cigarillo of other similar article, the FES's may be incorporated in any of the portions of the smoking article. For example, the FES's can be added to the bulk tobacco from which the tobacco rod is made. Additionally, the FES's may be incorporated into the wrapper of a cigar, cigarette, cigarillo or other like article. Further, the FES's can be formed into a unitary solid and mechanically inserted into the tobacco rod of a cigar, cigarette, cigarillo or other like article. FES's may also be incorporated in the filters (if used) in a cigar, cigarette or cigarillo. Other manners of incorporating FES's into a cigar, cigarette, cigarillo or other like article are possible and are within the ambit of this disclosure.

Electrically heated cigarettes (EHC's), for example as described in U.S. Pat. No. 5,692,525 the disclosure of which is hereby incorporated by reference, are smoking articles that are used in combination with smoking systems which include electrically powered heaters that receive a portion of the EHC. Once an EHC is inserted into an appropriate smoking system, it is used in much the same fashion as a traditional cigarette, but without lighting or smoldering the cigarette. When an EHC is heated in its smoking system, it produces tobacco smoke which the consumer then inhales.

EHC's may take a variety of forms, and may include some or all of the following parts: a cigarette paper overwrap; tobacco web; tobacco plug(s); filters of various forms; voids or air pockets. The cigarette paper overwrap, if used, provides the outermost surface of at least a portion of the length of the EHC. A tobacco web is a sheet material comprising tobacco particles and fibers, as well as other ingredients used as binders, humectants and with a variety of other functions. The tobacco web is often made into a cylindrical form surrounding, for at least part of the length of the EHC, all of the components of the EHC, except for the paper overwrap. Tobacco plugs are generally cylindrical agglomerations of tobacco. Tobacco plugs can be used in EHC's, and if used, will generally only extend through a portion of the length of the EHC. If used, the tobacco plug is the concentric center of the EHC cross section, and will be encircled by a tobacco web, a cigarette paper overwrap or both. Filters of a variety of forms, including free-flow filters, back flow filters and mouthpiece filters can be incorporated in an EHC. Voids or open spaces or air pockets can also be incorporated in the design of an EHC.

In an electrically heated cigarette, the FES's may be incorporated in any of the portions of the EHC. For example, FES's may be incorporated in the tobacco web, tobacco plug, paper overwrap, or in or on any of the filters used to make the EHC. Other manners of incorporating FES's into an electrically heated cigarette are possible and are within the ambit of this disclosure.

Smokeless Tobacco Compositions

In one embodiment, a smokeless tobacco composition is provided which comprises a mixture of tobacco and one or more FES's.

The FES's may be incorporated into a smokeless tobacco composition in a variety of ways. For example, FES's can be dissolved in an appropriate solvent and applied to a tobacco or mixture of tobaccos, for example, by spraying. The FES's may also be suspended in a liquid and applied to a tobacco or mixture of tobaccos, for example, by spraying. Further, the FES's may be added as a powder to a tobacco or mixture of tobaccos. Release of the flavorant can be accomplished by mastication, hydrolysis or some mixture of non-pyrolytic release mechanisms. Thus it would be possible using these FES's to produce, for example, a container enclosing multiple flavors of snuff, where each flavor is unaffected by the other flavors in the container.

Comestibles and Other Products for Oral Use

In another embodiment, one or more FES's are used in comestible products. In one embodiment, the comestible product contains a foodstuff, beverage, oral care composition, or other comestible material that has been treated with 0.0001-10% by weight of one or more FES's. The FES may be added at any suitable point in the processing of the comestible material, so long as the mixture is not subsequently subject to conditions, such as high temperatures, that might cause premature release of the flavorant compound(s) (i.e., prior to use by the consumer). Release of the flavorant compounds can be accomplished by hydrolysis occurring when the comestible is consumed. Thus, it would be possible to make, for example, a mint-flavored chocolate which does not flavor other mint-less chocolates with which it is packaged. In another embodiment, release of the flavorant compounds can be accomplished by hydrolysis that occurs when the comestible is prepared by the consumer for use, such as release of mint or other flavor in a hot chocolate, cocoa, coffee or tea drink when hot water is added.

In another embodiment, one or more FES's are used in other compositions for oral use, for example in lozenges, pharmaceutical formulations, dental floss, treatments and appliances, toothpicks, and other products meant to be used orally. In this embodiment, the release characteristics of the FES are similar to those for comestibles, as described above.

Heatable or Combustible Items of Manufacture

One or more FES's may be incorporated into heated or combustible products in order to release pleasant fragrances into the local atmosphere when the product is heated or burned. For example, by incorporating 0.0001-10% by weight of the FES's into an otherwise unscented candle, a candle is produced which has little or no discernable fragrance before lighting, but releases a fragrance upon combustion. Other products contemplated incorporating an FES include fragrance sticks, incense, room deodorizers, artificial or treated fireplace logs and other products which are heated or combusted in a domestic or other environment for aesthetic reasons.

Example 1

Synthesis of Monomenthyl Succinate

A 500 ml round bottom flask was charged with succinic anhydride (25 g, 0.25 mol), p-toluene sulfonic acid (1.0 g) and anhydrous toluene (125 ml) and heated to reflux. Menthol (25 g, 0.25 mol) dissolved in anhydrous toluene (100 ml) was added drop-wise to the refluxing solution at 135° C. After the menthol solution was added, the mixture was refluxed for an additional five hours. After cooling to room temperature, the mixture was washed with de-ionized (DI) water (5×200 ml). The toluene was removed by rotary evaporator, followed by removal under high vacuum at 70° C. No menthol was distilled from the crude product at high vacuum (0.1 torr) at 120° C., showing complete conversion to monomenthyl succinate. The crude product was crystallized from hexanes to form white crystals. $^1$H NMR showed monomenthyl succinate in high purity (FIG. 1).

Example 2

Conversion of Monomenthyl Succinate to Potassium Monomenthyl Succinate

Monomenthyl succinate (5.0 g, 19.5 mmol) was added to an aqueous potassium hydroxide solution (1.09 g, 19.5 mmol in 50 ml DI water) at room temperature. The mixture was stirred for two hours until the menthyl succinate completely dissolved. Water was removed by freeze drying to give white powder. Dried samples were tested by thermogravimetric analysis/mass spectrometry (TGA/MS) and gas chromatograph/mass spectrometry (GC/MS). Additionally, a small sample was heated in a vial by heat gun and considerable menthol was released.

Example 3

Figure 2:
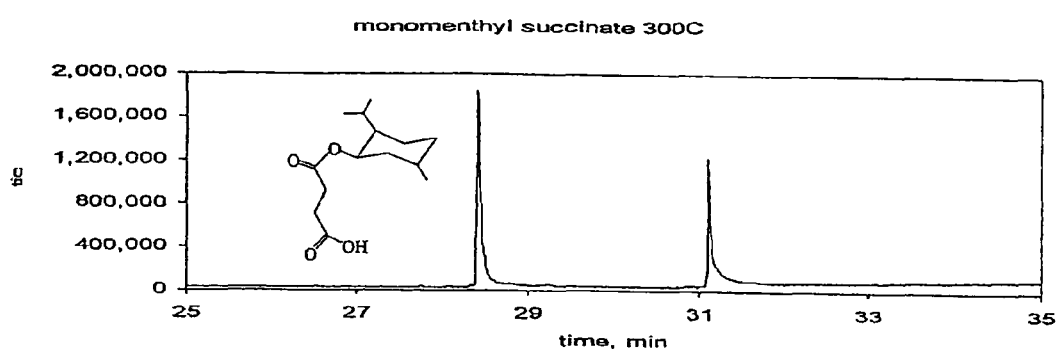
FIG. 2 illustrates a GC/MS plot of pyrolysis of monomenthyl succinate at 300° C.

Comparative Pyrolysis of Monomenthyl Succinate, Potassium Menthyl Succinate and a Mixture of Monomenthyl Succinate and Potassium Hydroxide Pyrolysis of monomenthyl succinate was analyzed by GC/MS as well as by TGA/MS. At 300° C., monomenthyl succinate released menthene and menthol in approximately a 2:1 ratio (FIG. 2).

Figure 3:
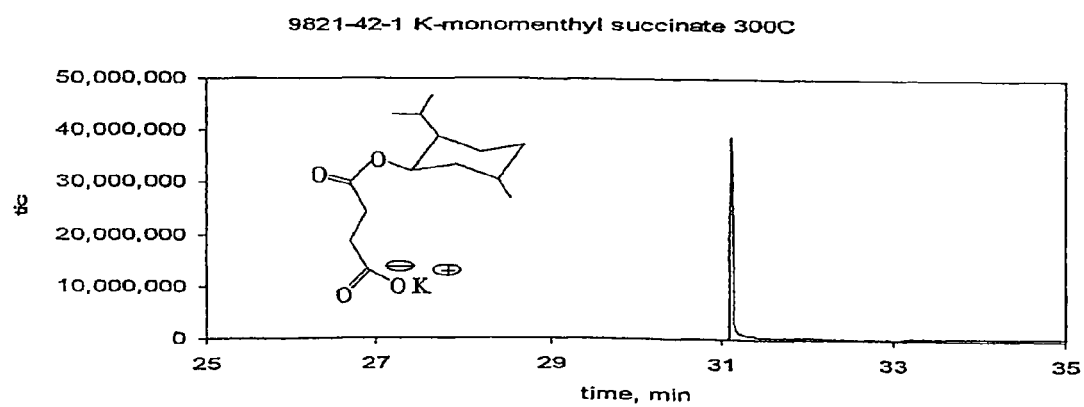
FIG. 3 illustrates a GC/MS plot of pyrolysis of potassium monomenthyl succinate at 300° C.

Pyrolysis of potassium monomenthyl succinate was analyzed by GC/MS as well as by TGA/MS. At 300° C., potassium monomenthyl succinate released only menthol, producing no menthene (FIG. 3).

Pyrolysis of a physical mixture of monomenthyl succinate and potassium hydroxide were analyzed by GC/MS. No menthol release was observed.

Example 4

Conversion of Monomenthyl Succinate to Calcium Monomenthyl Succinate

Monomenthyl succinate (5.0 g, 19.5 mmol) was dissolved in ethanol (104 ml). A suspension of Ca(OH)$_2$ in water (1.52 g of 95% Ca(OH)$_2$, 19.5 mmol in 62 ml DI H$_2$O) was slowly added at room temperature. The mixture was stirred for 19 hours. Water and ethanol were removed by rotary evaporator at 50° C., and then under a high vacuum line at 50° C. to give calcium monomenthyl succinate as a fine white powder.

Example 5

Conversion of Monomenthyl Succinate to Sodium Monomenthyl Succinate with Sodium Carbonate Monomenthyl succinate (0.5 g, 1.95 mmol) was dissolved in ethanol (6.3 ml). Sodium carbonate solution (0.207 g, 1.95 mmol in 10 ml DI H$_2$O) was slowly added to the monomenthyl succinate solution at room temperature. The mixture was allowed to stir for 19 hours. Water and ethanol were removed by rotary evaporator at 50° C., followed by high vacuum line at 50° C. to give sodium monomenthyl succinate as a fine white powder.

Example 6

Conversion of Monomenthyl Succinate to Sodium Monomenthyl Succinate with Sodium Bicarbonate Monomenthyl succinate (0.5 g, 1.95 mmol) was dissolved in ethanol (6.3 ml). Sodium bicarbonate solution (0.196 g, 2.33 mmol in 10 ml DI $H_2O$) was slowly added to the monomenthyl succinate solution at room temperature. The mixture was stirred for 19 hours. Water and ethanol were removed by rotary evaporator at 50° C., followed by high vacuum line at 50° C. to give sodium monomenthyl succinate as a fine white powder.

Example 7

Pyrolysis of Sodium Methane Tricarboxylic Acid Diguaicyl Ester

Sodium methane tricarboxylic acid diguaicyl ester (Formula I) was heated in a vial using a heat gun. Guaicol was released from the FES and was detectable by its distinctive odor.

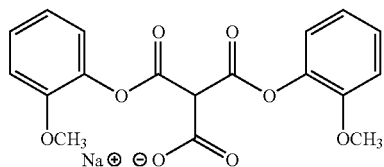

(I)

Example 8

Synthesis of Sodium Monogeraniyl Glutarate

A round bottom flask was charged with glutaric anhydride (28.5 g, 0.25 mol), p-toluene sulfonic acid (1.0 g) and anhydrous toluene (100 ml) and heated to reflux under a nitrogen atmosphere. Geraniol (38.5 g, 0.25 mol) was dissolved in anhydrous toluene and added dropwise to the refluxing solution. After the addition was complete, the mixture was refluxed overnight. After the solution had cooled to room temperature, it was washed with distilled water. Then, toluene was removed from the mixture under high vacuum at an elevated temperature (60-80° C.). The resultant powder was then dissolved in ethanol (100 ml). Sodium bicarbonate solution (3.0 M in DI $H_2O$, 100 ml, 0.3 mol) was slowly added to the ethanol solution and allowed to stir for approximately one day. Water and ethanol were removed by high vacuum line at an elevated temperature (60-80° C.) to give sodium monogeraniyl glutarate as a powder.

While the foregoing has been described in detail with reference to specific embodiments thereof, it will be apparent to one skilled in the art that various changes and modifications may be made, and equivalents thereof employed, without departing from the scope of the claims.

The invention claimed is:

1. A smoking composition comprising a mixture of smokable material and an ester containing an alcohol moiety that is a flavorant and an acid moiety that is a polycarboxylic acid, wherein at least one of the carboxyl groups of the polycarboxylic acid is in the form of a metal salt, wherein there is at least one carbon atom between the carbonyl carbon of the ester and the carboxyl carbon forming the salt and wherein the smokable composition is in the form of a rod, wherein the polycarboxylic acid is selected from the group consisting of malonic acid, succinic acid, glutaric acid and adipic acid, and wherein the flavorant is selected from the group consisting of menthol, vanillin, linalool, guaicol, thymol, geraniol and eugenol.

2. The smoking composition of claim 1, wherein the smokable material comprises tobacco.

3. The smoking composition of claim 1, wherein the metal is selected from the group consisting of sodium, potassium, magnesium and calcium.

4. The smoking composition of claim 1, wherein the acid moiety is a succinic acid moiety, the alcohol moiety is a menthol moiety, and the salt is a metal salt.

5. The smoking composition of claim 4, wherein the metal salt is a potassium salt.

* * * * *